United States Patent [19]

Cassagne

[11] Patent Number: 4,938,699

[45] Date of Patent: Jul. 3, 1990

[54] APPARATUS FOR DETECTING EXCHANGES THROUGH THE CUT END OF A PLANT BRANCH

[76] Inventor: Serge Cassagne, 14 Rue Vergniaud, 75013 Paris, France

[21] Appl. No.: 320,097

[22] PCT Filed: Jun. 3, 1988

[86] PCT No.: PCT/FR88/00284

§ 371 Date: Jan. 26, 1989

§ 102(e) Date: Jan. 26, 1989

[87] PCT Pub. No.: WO88/09611

PCT Pub. Date: Dec. 15, 1988

[30] Foreign Application Priority Data

Jun. 3, 1987 [FR] France ................................ 87 07735

[51] Int. Cl.$^5$ ............................................. C12M 1/36
[52] U.S. Cl. .................................. 434/276; 73/432.1; 47/60; 435/291
[58] Field of Search ............... 434/276, 324, 295, 296, 434/297; 47/60, 62, 65, 67; 73/432.1, 866; 435/290, 291, 284; 422/102

[56] References Cited

U.S. PATENT DOCUMENTS 4,314,029  2/1982  Ohtake et al. ........................ 435/291

FOREIGN PATENT DOCUMENTS

| 57-131060 | 8/1982 | Japan . | |
|---|---|---|---|
| 59-38655 | 3/1984 | Japan . | |
| 0631120 | 11/1978 | U.S.S.R. | 47/62 |
| 954054 | 8/1982 | U.S.S.R. . | |
| 0961608 | 10/1982 | U.S.S.R. | 47/62 |
| 1042689 | 9/1983 | U.S.S.R. | 47/62 |
| 1223858 | 4/1986 | U.S.S.R. . | |
| 1397006 | 5/1988 | U.S.S.R. | 47/62 |

Primary Examiner—Richard J. Apley
Assistant Examiner—Rachel M. Healey
Attorney, Agent, or Firm—Young & Thompson

[57] ABSTRACT

Cut end (22) of an aquatic plant branch (18) is engaged in the mouth (21) of a gas release tube (19) which goes from a photosynthesis tank (2) containing branch (18). Tube (19) establishes a vessel (link 2) connecting photosynthesis tank (2) and a tank (4) in which a test tube (26) collects the release. Between the two tanks, the tube passes through a compartment (3) for observation of the release. The apparatus has a transparent bottom (16) allowing it to be placed on the light table of an overhead projector to project the image of the experiment on a screen.

14 Claims, 4 Drawing Sheets

U.S. Patent    Jul. 3, 1990    Sheet 3 of 4    4,938,699
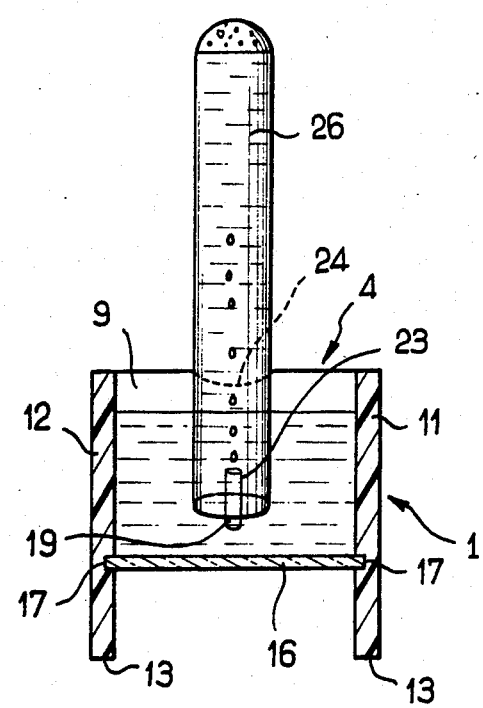
FIG. 6
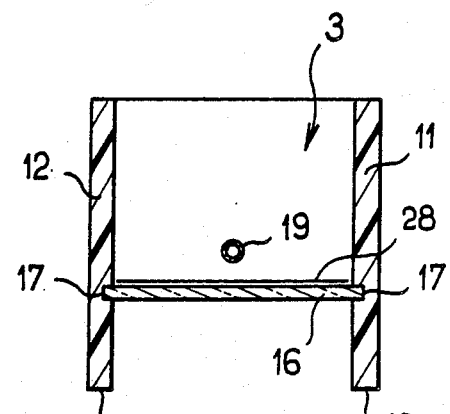
FIG. 5
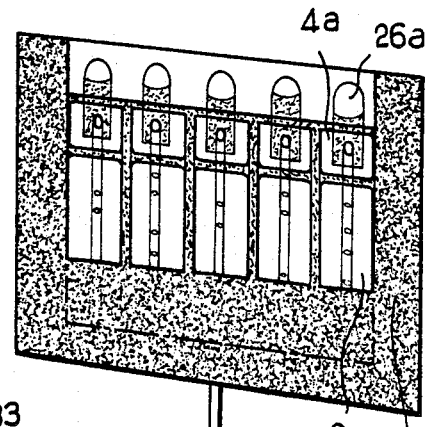
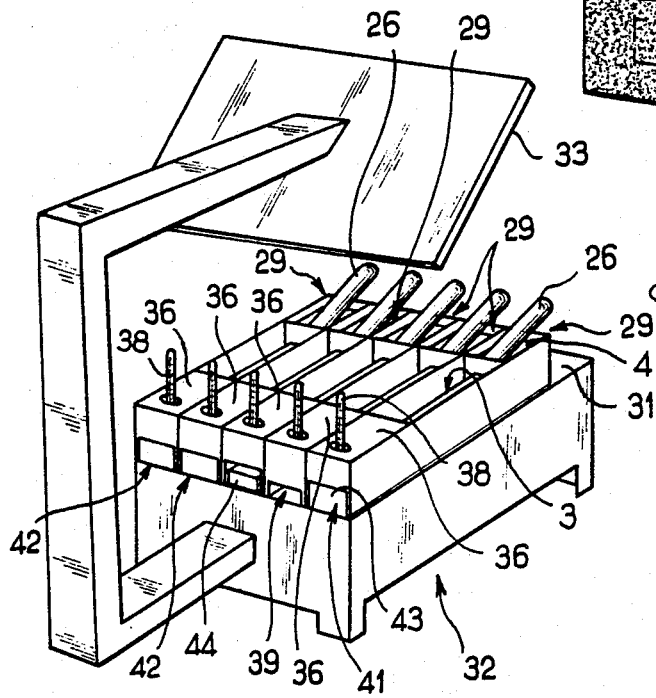
FIG. 7

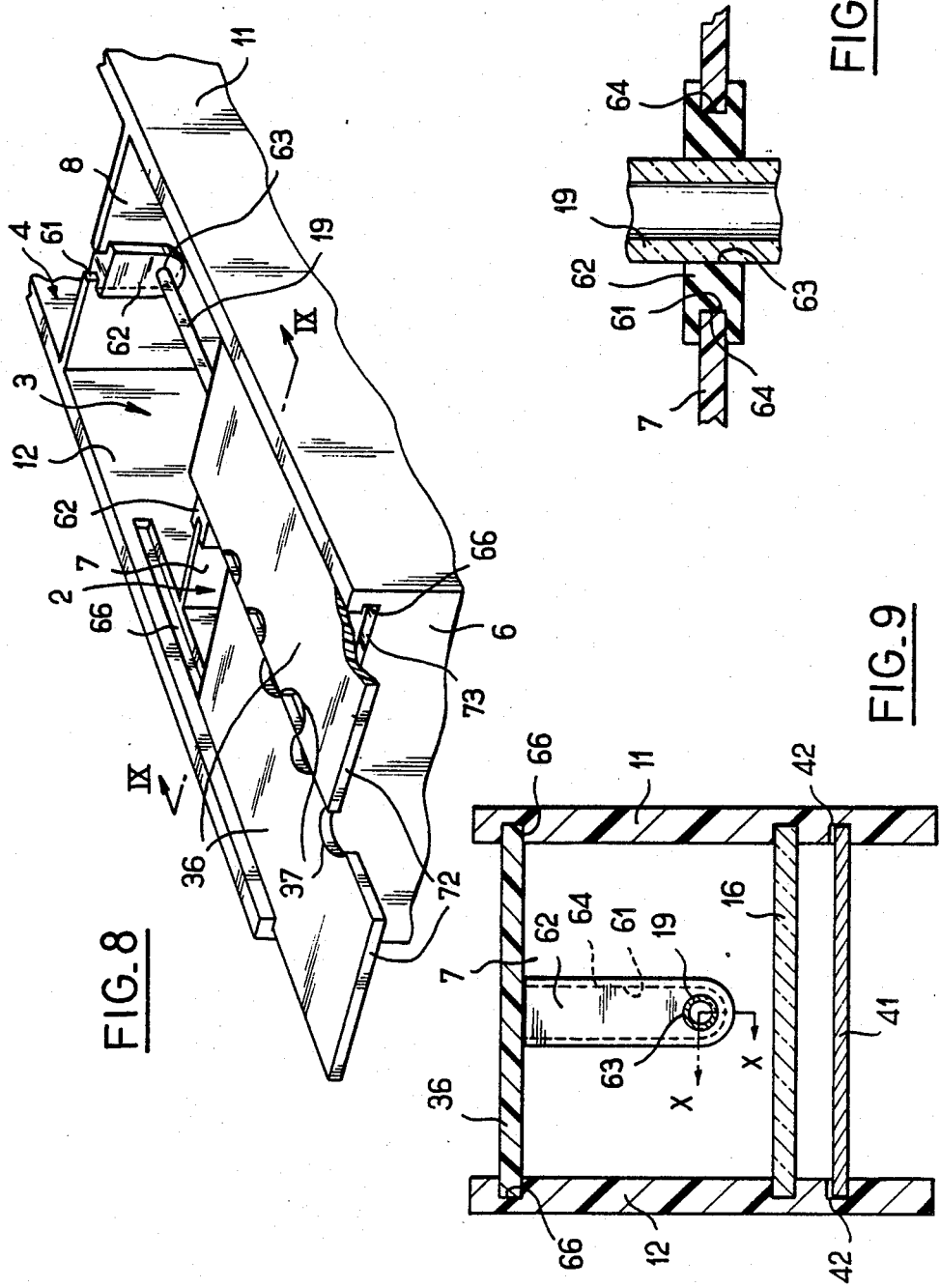

APPARATUS FOR DETECTING EXCHANGES THROUGH THE CUT END OF A PLANT BRANCH

This invention relates to an apparatus to detect exchanges through the cut end of a plant branch, for experimental purposes, most often for educational purposes. The invention relates particularly to photosynthesis apparatus and potometers.

A photosynthesis apparatus is known comprising a tank of the test tube type intended to contain a branch of an aquatic plant such as the Elodea canadensis, whose cut end is directed upward. This end is received in the mouth, descending into the tank, of a gas release tube directed upward to pipe and trap the gas bubbles emitted by the cut end of the stem when the branch is suitably illuminated. For this purpose, the tank is transparent.

Setting up the experiment with this apparatus is particularly laborious. For the gas release to be able to be seen and isolated in the tube, it is necessary for the tube to be initially filled with liquid by purging the air with a syringe. As the air initially contained in the tube is purged, some liquid is sucked from the tank and therefore its level has to be topped off to keep the mouth of the tube immersed. After that, the plant branch has to be put into the tank, which is difficult. Access to the tank is made difficult by the presence of the tube. The agitation that results on the surface of the liquid in the tank risks allowing entry of air into the tube, which would make it necessary to restart the purging. Further, it is necessary for the cut end of the Elodea branch to remain engaged in the input funnel of the tube. If this is lacking, the gas release would escape into the open air by the surface of the bath instead of being piped into the tube. It would be possible to consider sinking the branch deeply into the funnel to be held there by friction, but then the mouth of the tube would be blocked, which would prevent the gas release from occuring since the liquid initially contained in the tube, prevented from returning into the tank, would not leave any place for the gas.

Device for measuring the absorption of water by a plant, or potometer, are also known. These known apparatus also present a problem of purging, besides bulk and great fragility due to a U-shaped tube.

The object of the invention is to remedy these drawbacks by proposing an apparatus of the photosynthesis or potometer apparatus type that is very easy to use.

The invention thus relates to an apparatus to detect exchanges through the cut end of a plant branch, comprising a tank, a transit tube connected by a first end with the tank and one of whose ends at least is intended to receive the cut end of a plant branch.

According to the invention, a second end of the tube is associated with means able to contain a liquid, the transit tube establishing, at least in the abscence of the branch, a vessel link connecting the tank and means able to contain a liquid.

Thus, purging the tube is performed in a very simple way by filling the tank so that the liquid also fills the means for containing a liquid, by a transit tube. For a photosynthesis experiment it then suffices to place the plant branch in the tank with its cut end engaged in the transit tube. This operation does not pose any difficulties for two reasons. On the one hand, instead of being directed upward, the mouth of the transit tube, to establish said connecting vessel link, is in a position allowing free access by the top of the tank. On the other hand, according to the invention nothing prevents engaging the cut end of the branch in the mouth like a plug, of course, without compressing it too much. The gas release will occur nevertheless freely toward means suited to contain a liquid, which can consist of an end of the tube curved upward or of a so-called "release" tank.

If it is desired not only to verify the gas release but also to collect it, a test tube, for example, is used which is filled with water and which is plugged with the finger before turning it upside down and plunging its mouth, thus blocked, into the release tank, after which the finger is removed from said opening to engage it on the outlet (the second end) of the gas release tube. The gas release will thus take place in the test tube, while its water is gradually emptied in the release tank. To keep the water from contaminating the photosynthesis tank by the gas release tube, it suffices, as indicated above, to place the plant branch like a plug in the first end of the gas release tube. For use as a potometer, after filling, an air bubble is injected into the tube, then the cut end of the branch is engaged in the second end of the tube, directed upward. The branch transpires as a function of the conditions to which it is exposed (temperature, ventilation) and by its cut end absorbs an amount of water which can be verified and/or measured according to the movement of the bubble.

According to an advantageous feature of the invention for use as a photosynthesis apparatus on a light table, in particular on the light table of an overhead projector, the tank has a bottom permeable to light.

Thus, the light table serves, on the one hand, to assure the necessary illumination for the photosynthesis reaction and, on the other hand, to display the release. This double role of illumination provided by the light table is made possible by the fact that the tank, the transit tube and the means to contain a liquid, which are linked as a connecting vessel, are located approximately at the same height. If the light table is that of an overhead projector, it is possible with a single apparatus to display the experiment for all the students of a class.

It is also certainly known to place in a projector of the type for slides a transparent tank containing an Elodea branch to project onto the screen the image of the Elodea and the gas release that it produces. However, it is then impossible to display the release in the tube. The invention makes it possible to display the photosynthesis experiment in a much improved form. In particular, the graduations provided on the transit tube or transparent sheets marked in millimeters placed under the tube will also be visible on the screen.

Further, in the previously known experiment, the illumination provided by the projector serves both for causing the release and displaying the experiment. Therefore, it is not possible to show by projection the effect of darkness on the plant branch. On the contrary, in an advantageous embodiment, the apparatus according to the invention comprises means to regulate the illumination of the photosynthesis tank through its bottom, and the release tank is transparent independently of said means.

It will also be noted that illumination by an overhead projector heats the projected object much less than a slide projector and consequently influences the good progress of the experiment much less.

Also preferably, the apparatus according to the invention has, in top view, an elongated rectangular shape making it possible to place several similar apparatus side by side on the light table of an overhead projector to perform a comparison experiment simultaneously.

Other features and advantages of the invention will also come out from the following description.

In the accompanying drawings, given by way of nonlimiting example:

FIGS. 3 to 6 are views of the devices of FIGS. 1 and 2, in section along planes III—III, IV—IV, V—V, VI—VI, respectively of FIG. 2, FIG. 4, however, displaying another means for regulating the illumination in the photosynthesis tank;

FIG. 7 is a view of several apparatus like that of FIGS. 1 to 6, placed side by side on an overhead projector;

FIG. 8 is a partial perspective of a second embodiment of the apparatus according to the invention, the cover being represented in two different positions;

FIG. 9 is a view in section along plane IX—IX of FIG. 8;

FIG. 10 is a view in section along plane X—X of FIG. 9; and

FIG. 11 is a view of use as a potometer.

Figure 1:
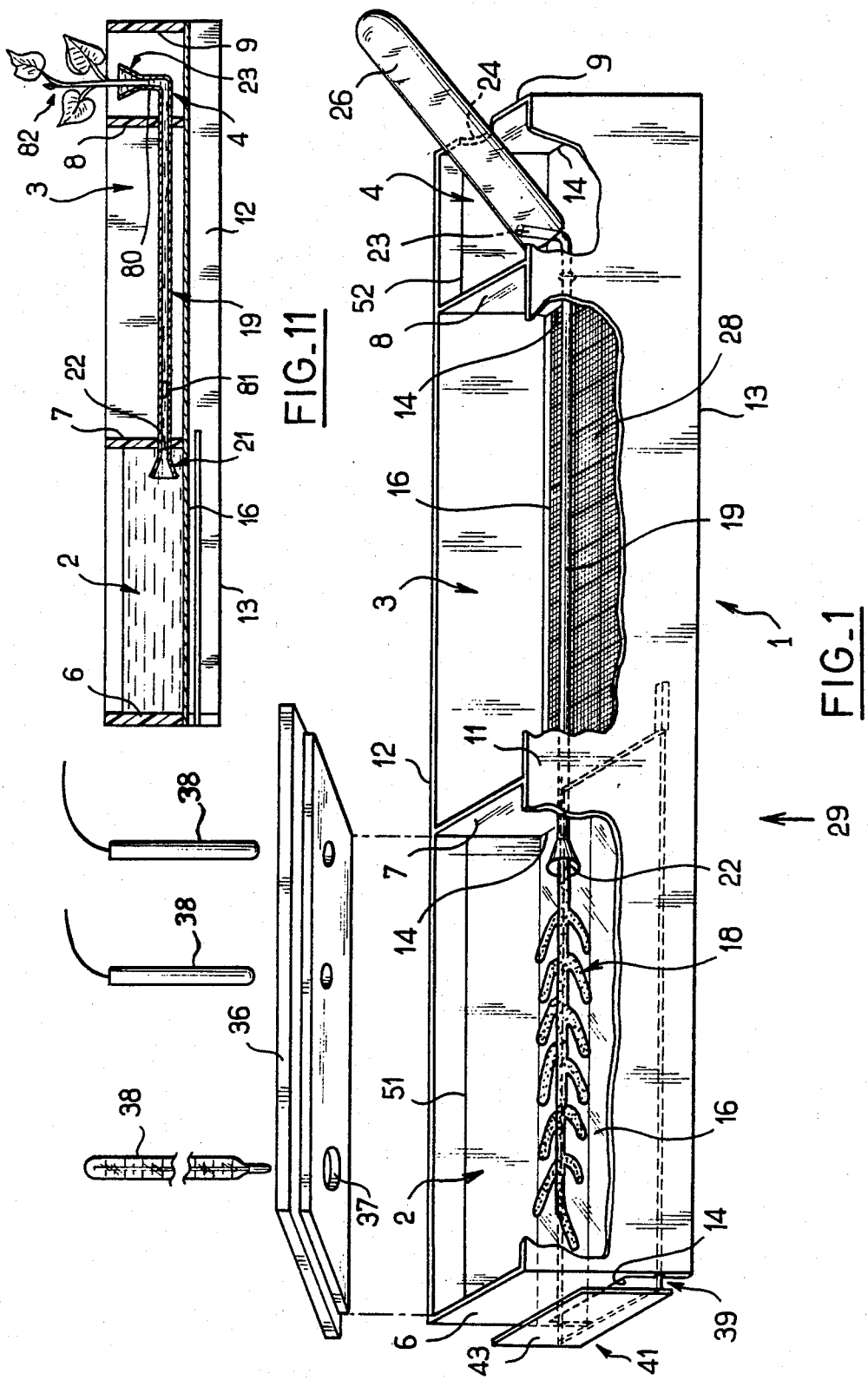
FIG. 1 is a perspective view with tearaway of the apparatus according to the invention, used as a photosynthesis apparatus.
Figure 2:
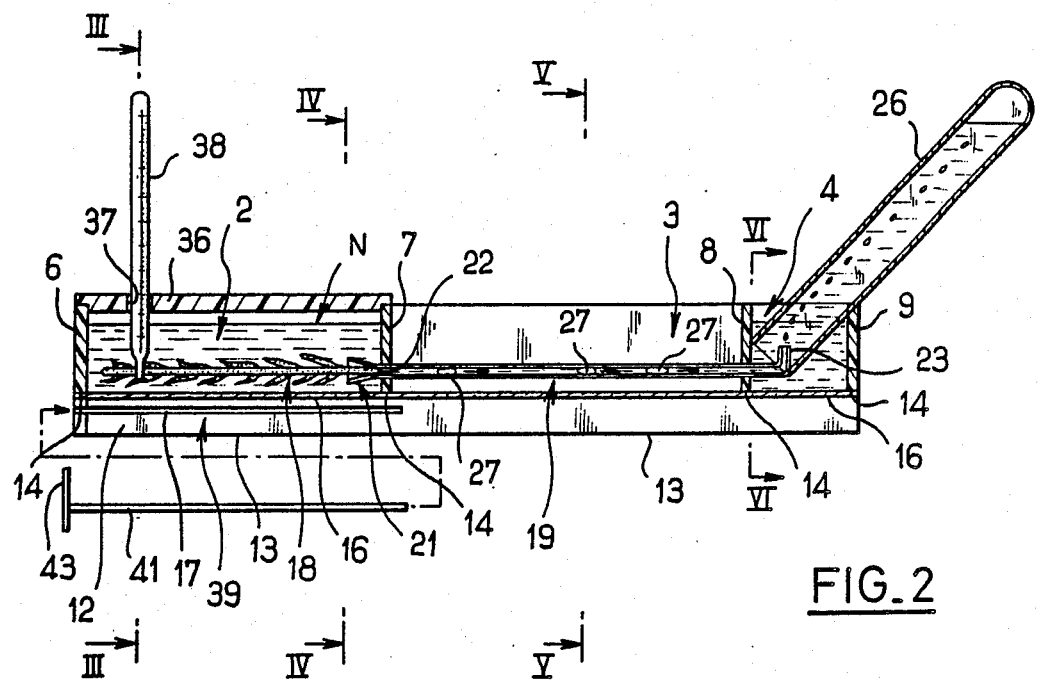
FIG. 2 is a view in longitudinal section of the device of FIG. 1, being used.
Figure 3:
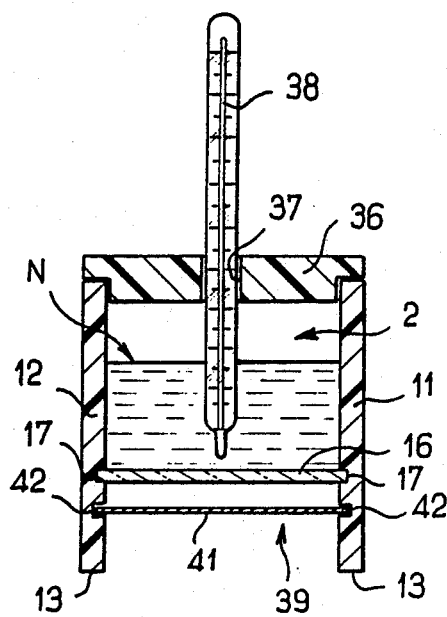
Figure 4:
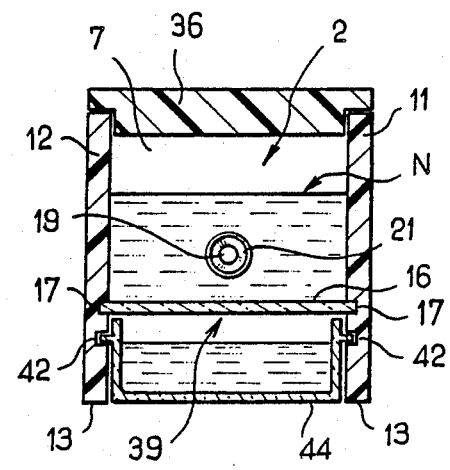

The apparatus according to the invention comprises a body 1 of opaque plastic, for example polystyrene, which defines the lateral walls of three aligned rectangular compartments 2, 3 and 4, (FIGS. 1 and 2).

Body 1 defines in particular four parallel crosswise walls 6 to 9, and two parallel longitudinal walls 11 and 12 joined to one another by each of crosswise walls 6 to 9. Longitudinal walls 11 and 12 each have a lower edge 13 offset downward relative to lower edge 14 of each of crosswise walls 6 to 9. Longitudinal walls 11 and 12 thus form a base of the apparatus relative to which walls 6 to 9 are raised. A transparent plane plate 16, for example of glass, is engaged between lateral walls 11 and 12 in two grooves 17 (FIGS. 3 to 6) which exhibit two walls 11 and 12 toward one another. The position of grooves 17 is such that the glass plate is parallel to the support plane defined by edges 13 and is in contact with lower edge 14 of each of crosswise walls 6 to 9. Plate 16 is tightly glued in grooves 17 and against edges 14 of walls 6 to 9.

Plate 16 thus constitutes a transparent bottom for a photosynthesis tank formed by compartment 2, located at one of the ends of the alignment of compartments 2, 3 and 4.

Photosynthesis tank 2 is intended to contain, approximately in horizontal position parallel to walls 11 and 12, a plant branch 18 (FIG. 2), of an aquatic plant such as Elodea, in a liquid suitable for the planned experiments, reaching level N which need not be determined with precision.

A transit tube—or gas release tube—19, of transparent material such as glass, has a first end—or mouth—21 in the shape of a funnel located in tank 2 below level N and intended to receive cut end 22 of branch 18.

According to the invention, gas release tube 19 established, at least in the absence of branch 18, a vessel link connection between photosynthesis tank 2 and a release tank which consists, above plate 16, of compartment 4 located at the other end of the alignment line of compartments 2, 3 and 4.

When the apparatus is in operating position, most of the length of tube 19 is approximately horizontal, optionally with a very slight upward slope of tank 2 toward tank 4 to assure the good transit of the gas during the experiment. Preferably, tanks 2 and 4 exhibit, on their inner wall, liquid level markers 51 and 52 (FIG. 1) placed relative to one another to be reached simultaneously when the horizontality or slight slope of the apparatus is correct. The direction of mouth 21 is approximately horizontal during operation. Tube 19 goes, in a sealed manner, through wall 7 separating compartments 2 and 3 and wall 8 separating compartments 3 and 4. In compartment 4—or release tank—tube 19 is bent to exhibit a second end—or mouth—23 directed opposite wall 16, i.e., upward when the apparatus is operating position. However, mouth 23 is located below the level reached by the liquid in release tank 4 by virtue of the vessel type link connected with photosynthesis tank 2. As FIGS. 1 and 6 show, crosswise wall 9 of body 1 exhibits, in the middle of its upper edge, a notch 24 intended to contribute to the positioning of a test tube 26 whose opening, directed obliquely downward, is engaged freely and with play around mouth 23 of tube 19.

Tube 19 extends in a plane parallel to longitudinal walls 11 and 12. Thus, in compartment 3, the tube extends straight for a certain distance above transparent wall 16. As FIG. 2 shows, compartment 3 is a compartment for observation of bubbles 27 released by Elodea 18. The number of bubbles per unit of time can be counted and the numbers of bubbles per unit of time recorded under different experimental conditions can be compared. To refine the experiment, it is possible to place on the upper face of wall 16, in compartment 3, a transparent sheet 28 with millimeter cross ruling (FIG. 1), making it possible to measure the lenght of the bubbles, and consequently their volume, the inside diameter of tube 19 being known. In operation, compartment 3 does not contain any liquid.

As FIG. 7 shows, apparatus 29, which has just been described, is intended more particularly to be used on a horizontal light table 31, and in particular light table 31 of an overhead projector 32. By "overhead projector" is understood an apparatus whose table 31 projects by transparency the image of objects 29 placed on it to an oblique mirror 33 which reflects the image onto a display screen 34.

The apparatus described with reference to FIGS. 1 to 6 has a very elongated rectangular shape parallel to walls 11 and 12, so that it is possible to place five apparatus 29 side by side on light table 31 of overhead projector 32. Thus, it is possible to display on screen 34, by way of comparison, five experiments performed under different conditions.

For use on light table 31, compartment 3 and release tank 4 are tansparent in a direction perpendicular to transparent wall 16. Thus, the light emitted by table 31 projects on screen 34, via mirror 33, the image of the experimental device occupying each compartment 3 and each release chamber 4.

The light emitted by table 31 also serves to illuminate the inside of photosynthesis tank 2 through wall 16. To avoid any unwanted influence on this illumination, tank 2 is equipped with a removable cover 36 which, during the experiment, firmly closes tank 2. However, cover 36 is equipped with one or more orifices 37, making it possible to plunge into tank 2 one or more measuring apparatus such as a thermometer, pH meter, oximeter 38. Always to avoid altering the illumination inside tank 2, the latter has white inside surfaces, except, of course, its transparent bottom 16. To make such white walls, it is advantageous for the plastic constituting body 1 and cover 36 to be opaque and have a white color overall.

Taking into account the presence of covers 36 (FIG. 7), overhead projector 32 does not project the image of photosynthesis tanks 2 on screen 34. Only images 3a and 4a of compartments 3 nad tanks 4, respectively, appear on screen 34, like images 26a of test tubes 26. For the transmission of these images to be as good as possible, compartments 3 and tanks 4 are open upward during the experiment.

The apparatus according to the invention also comprises means to regulate the illumination of photosynthesis tank 2 through bottom 16 of the latter, these means not affecting the transparency of compartment 3 and release tank 4.

As these regulating means (FIGS. 2 to 4), there is provided under bottom 16 of photosynthesis tank 2 a free site 39 located between longitudinal walls 11 and 12. Opaque and colored screens 41 in turn can be removably positioned in space 39 parallel to wall 16 and held in this position by two slides 42 carried opposite one another by walls 11 and 12, respectively. Each screen 41 has, parallel to the longitudinal direction of walls 11 and 12, a longitudinal dimension allowing it to project slightly under compartment 3 to prevent the oblique passage of light between the end of screen 41 and lower edge 14 of partition 7. Shutters 41 exhibit, at their end that is adjacent in operation to partition 6, a closing plate 43 closing approximately the corresponding end of lower space 39.

Means to regulate the illumination of tank 2 through its bottom 16 also comprise an additional tank 44 (FIG. 4) of appropriate shape to occupy space 39 under tank 2. Additional tank 44 is suited to contain a liquid, for example a chlorophyll solution, able to alter the illumination in a way that influences the phenomenon of photosynthesis.

The operation of the appratus of FIGS. 1 to 7 will now be described.

At the start, in the absence of branch 18, the apparatus being clean and dry, tank 2 is filled with a liquid which, for example, can be distilled water, water to be studied, for example, tap water, water from a sea or river, water with various additives such as anesthetics, poisons, pollutants, $CO_2$, or also water whose pH has been selected at will. Filling of tank 2 causes filling of tank 4 by tube 19 which, at the end of filling, is also full.

Then branch 18 is placed in tank 2 by plunging the cut end of the branch in mouth 19 so that said end forms a stopper there. Cover 36 is placed on top of the tank and apparatus 38 in orifice 37.

Then tube 26 is filled with water, it is plugged with the finger, taking care not to enclose air bubbles, it is turned upside down and plunged into release tank 4, the finger is removed from the opening of tube 26, which is placed, while being kept immersed, around outlet 23 of tube 19.

After having optionally positioned a screen 41 or tank 44 under photosynthesis tank 2, apparatus 29 is placed on light table 31, to observed the phenomenon on screen 34.

Thanks to space 39 separating photosynthesis tank 2 of light table 31, the heat release from table 31, already slight in itself, has only a reduced influence on the temperature in photosynthesis tank 2.

As FIG. 2 shows, the release gases collect on the bottom, directed upward, of tube 26, while the water contained in the latter correspondingly flows back into tank 4. However, there is no reflux to tank 2 because end 22 of branch 18 blocks tube 19 in an approproximately tight manner. Therefore, the liquid in tank 2 is not altered. When the level in tank 4 increases because of input coming from tube 26, a possible overflow can run over by notch 24, but it can be prevented by a removal with a dropper.

Whether it is screen 41 or the liquid (contained in tank 44) which is interposed between the light source and photosynthesis tank 2, display of the release is always optimal on screen 34.

Apparatus 29 which has just been described can also be used by direct observation on the light table, or also be direct observation on a regular table, illumination of the three compartments being performed from above preferably with a white opaque screen 41 under tank 2. Illumination in tank 2 can be regulated by means of covers such as 36 (not represented), transparent and with or without coloring, or also be means of an additional tank such as 44 placed on the transparent cover. Of course, opaque cover 36 can be put on if it is desired to perform the experiment in the case where branch 18 is in the dark.

The experiment of the phenomenon under variable light can be performed by regulating the power of the illumination source (overhead projectors generally comprise such a regulation) or by interposition of dimming screens of the tracing paper type between the light source and the tank.

In the embodiment of FIGS. 8 to 10, which will be described only in regard to their differences from the preceding one, partitions 7 and 8 each exhibit a median vertical slot 61, opening toward the top of the apparatus and able to receive in a tight manner an insert 62 of rubber or the like through which an orifice 63 for gas release tube 19 passes. Each insert 62 can be engaged by sliding in corresponding slot 61. The edge of slot 61 is received with a certain elastic tightness in a peripheral groove 64 of the insert to assure the seal.

Cover 36 is a slide running in opposite inside grooves 66 of lateral walls 11, 12. In a completely sunk position, (right half of cover 36 in FIG. 8), cover 36 is in contact by its lower face with the upper edge of partition 7 and of insert 62.

At a distance from partition 7, cover 36 comprises an edge 72 which, when cover 36 is completely sunk, projects beyond end wall 6 of the apparatus.

Upper edge 73 of wall 6, which is in the plane of the lower face of grooves 66 (FIG. 8), is then in contact with the lower face of cover 36.

Thanks to mounting tube 19 in inserts 62, the tube can be replaced if it has been broken or if it is desired to replace it with another tube, for example, of a different diameter. Sliding cover 36 is more stable than the cover of FIGS. 1 to 7, particularly when instruments are engaged in orifices such as 37. Advantageously, grooves 66 are identical with grooves 42 (FIG. 10), which makes it possible to replace sliding cover 36 with a filter such as 41, and conversely, to engage cover 36 in grooves 42 if it is desired to prevent the admission of light through transparent bottom 16.

The example represented in FIG. 11 illustrates the use as a potometer. The apparatus used is the same as that of FIGS. 1 to 10 except that second end 23 of transit tube 19 has been enlarged into a funnel. Such an enlargement is not of a nature to disturb the photosynthesis experiment.

Consequently, one and the same apparatus according to the invention can be used, as desired, as a photosynthesis apparatus and as a potometer.

For use as a potometer, tank 2 is filled with water until the water is flush with second end 23 of tube 19, in compartment 4, which does not contain water, the means to contain a liquid adjacent to end 23 consisting of vertical termination 80 of tube 19.

Then, by means of a syringe (not shown), an air bubble 81 is introduced into the horizontal area of tube 19 by end 21. Then the cut end of an aerial plant branch 82 is engaged in end 23 of tube 19. The desired conditions, particularly temperature and ventilation, are established near the branch.

The branch compensates for its transpiration by absorption of water through its cut end. This absorption is displayed by a movement of air bubble 81 in the direction of end 23. By knowing the diameter of the tube, measurement of this movement is a measurement of the amount of water absorbed by the branch.

This experiment, in particular movement of the bubble, can be displayed for an entire group thanks to an overhead projector.

Of course, the invention is not limited to the example described.

In particular the invention takes in the case in which the bottom of the photosynthesis tank is closed permanently by an opaque wall, the face permeable to light consisting of the upper wall or one of the lateral walls.

It is possible to provide several tubes such as 19, all connecting tank 2 to tank 4, to be able to compare the behavior of several different plants under identical conditions.

I claim:

1. Apparatus to detect exchanges through the cut end of a plant branch, comprising a tank (2), a transit tube (19) connected by a first end with said tank (2) and one of whose ends at least is intended to receive the cut end of a plant branch, characterized in that a second end (23) of said transit tube (19) is associated with means (4, 80) able to contain a liquid, the transit tube establishing, at least in the absence of the branch, a vessel link connecting said tank (2) and said liquid containing means (4, 80).

2. Apparatus according to claim 1, for use as a photosynthesis apparatus, wherein the tank is a photosynthesis tank (2) whose one face (18) at least is permeable to light, and wherein said plant receiving end of said transit tube (19) (22) of a plant, is the first end (21) of said transit tube (19).

3. Apparatus according to claim 2, wherein, for use on a light table (31), in particular on the light table of an overhead projector (32), the face permeable to light of the photosynthesis tank is a bottom of the latter.

4. Apparatus according to claim 3, wherein it comprises means (39, 41 to 44) to regulate the illumination of photosynthesis tank (2) through bottom (16) of the latter, and wherein said liquid containing means (4) are transparent along an axis approximately vertical in operation, independently of the means to regulate illumination (39, 41 to 44).

5. Apparatus according to claim 4, wherein said means to regulate the illumination inside said photosynthesis tank (2) comprise, under said bottom (16) of photosynthesis tank (2), means (39, 42) to position there elements selected from the group comprising opaque screen (41), a colored translucent screen (42), additional tank (44) and the like.

6. Apparatus according to claim 2, characterized by means (6, 7, 11, 12, 36) to make said photosynthesis tank (2) approximately opaque with the exception of its said permeable face (18) permeable to light.

7. Apparatus according to claim 6, wherein said opaque the means to make photosynthesis tank (2) approximately opaque comprise an opaque removable cover (36), selectively able to fit on said photosynthesis tank (2) opposite said bottom (16).

8. Apparatus according to claim 8, wherein the cover is pierced by at least one orifice (37) for introduction of a measuring device (38).

9. Apparatus according to claim 2, wherein said transit tube (19) has a mouth (21) whose direction is horizontal in operation to receive said branch (18) in an approximately horizontal position.

10. Apparatus according to claim 2, wherein the liquid containing means comprise a release tank (4), open in the direction opposite the bottom, and exhibiting, in the edge of its lateral wall (9) opposite bottom (16), a notch (24) intended to support in inclined position a test tube (26) whose opening, in operation, surrounds second end (23) of said transit tube (19).

11. Apparatus according to claim 1, wherein said tank (2) comprises a wall (7) exhibiting a slot (61) opening upward, in which is engaged, in tight and removable manner, an insert (62) through which said transit tube (19) passes.

12. Apparatus according to claim 1, wherein in top view it has an elongated rectangular shape making it possible to place several similar apparatus (29) side by side on a light table (31) of an overhead projector (32).

13. Apparatus according to claim 1, wherein said tube (19) comprises an approximately horizontal display area between its two ends.

14. Apparatus according to claim 13, wherein for use on a light table (31), in particular that of an overhead projector (32), said area of tube (19) and the apparatus itself close to said area are approximately transparent along an axis which is approximately vertical when the apparatus is in operation position to allow observation of gas bubbles (27) going through said transit tube (19) under illumination from a light table (31).

* * * * *